UNITED STATES PATENT OFFICE.

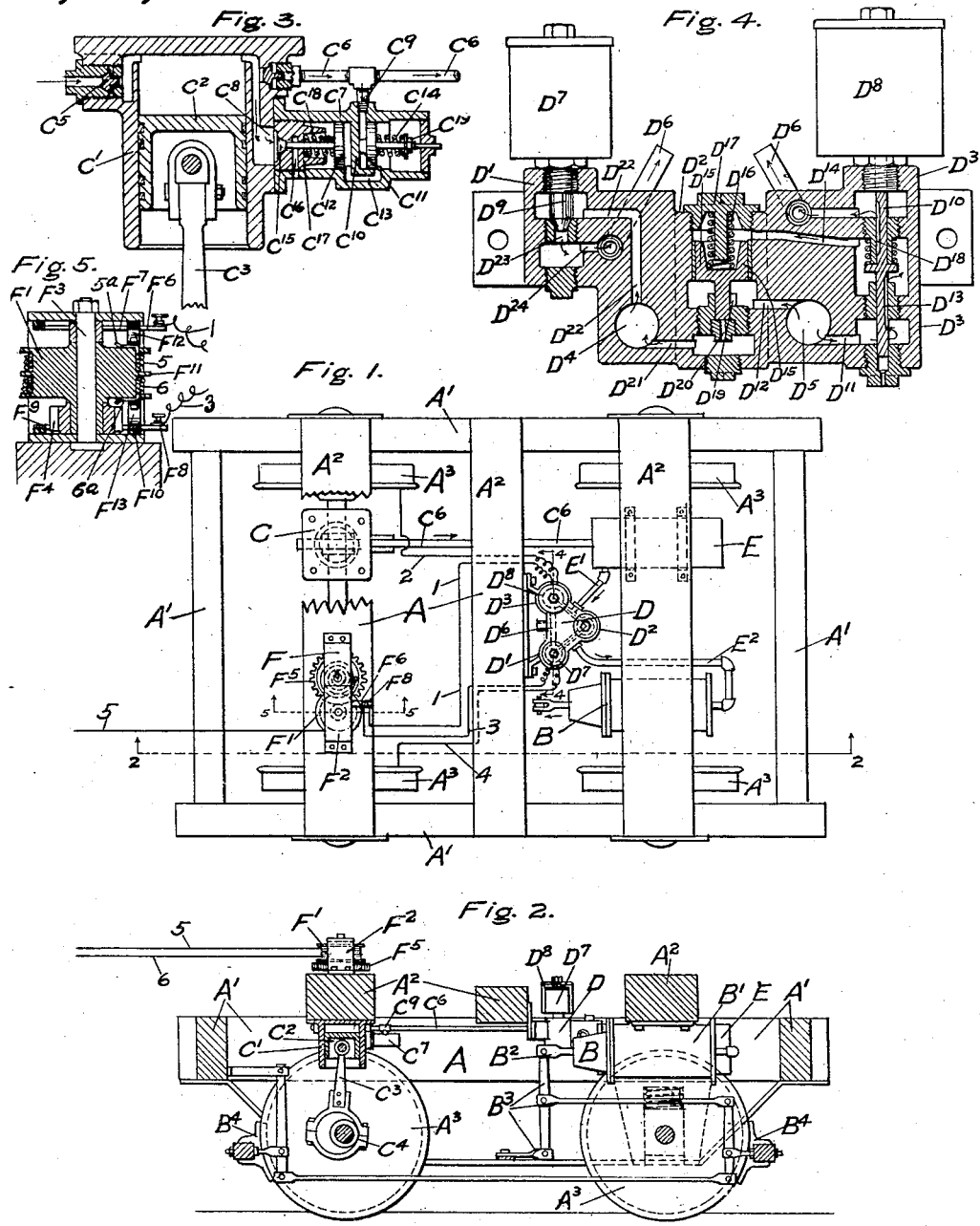

ELBERT G. CHANDLER, OF PORTLAND, OREGON.

AIR-BRAKE SYSTEM FOR TRUCKS.

1,251,181.  Specification of Letters Patent.  Patented Dec. 25, 1917.

Application filed October 23, 1913. Serial No. 796,916.

*To all whom it may concern:*

Be it known that I, ELBERT G. CHANDLER, a citizen of the United States, residing in the city of Portland, county of Multnomah, and State of Oregon, have invented certain new and useful Improvements in Air-Brake Systems for Trucks and the like, of which the following is a specification.

My invention relates to air brake systems for trucks, and the like, and more particularly to an individual or unit air brake mechanism or apparatus, complete in itself, and controllable from a distance, whereby to particularly adapt it for use on logging trucks or cars connected at long and varying distances apart in making up a train. For example, on logging roads it is the practice to have a train made up of a series of individual four-wheeled trucks or cars, one at each end of one or more logs, thereby separating the trucks or cars from each other at long and varying distances. Under such circumstances it is impracticable, if not impossible, to have pipes or air hose running from one truck or car to another for operating the air brakes of all the trucks in the train together in the usual manner.

The object of my invention is not only to make it easily possible, but to make it practical to control and operate individual air brake mechanisms, in series or individually, from a distant point, as from the engine.

I accomplish this by providing each car or truck with a coöperating combination of elements comprising the usual air brake mechanism, a storage tank, a compressor, operated by the car itself when in motion, and an electrically controlled valve mechanism, thus requiring only electric wires from one car or truck to the next one, or to the place of control, which wires can be easily taken care of on spools or reels so as to be taken up, or let out, with a minimum amount of trouble and expense.

In order that others may fully understand my invention, I have illustrated it as embodied in a logging car or truck on the accompanying sheet of drawings, which I will now describe.

Figure 1 is a top plan view of a four-wheeled truck or car equipped with my invention;

Fig. 2 is a longitudinal sectional view, in side elevation, taken on line 2—2 of Fig. 1;

Fig. 3 is a sectional view through one form of compressor;

Fig. 4 is a sectional view through a magnetic valve mechanism, taken on the irregular line 4—4 of Fig. 1, with parts in elevation; and Fig. 5 is a cross sectional view through the spool or reel mechanism for taking care of the circuit wires, as on line 5—5 of Fig. 1.

Referring now to the drawings, the coöperating elements constituting the invention may be identified as follows,—the truck as a whole is designated as A, the air brake mechanism as B, the compressor as C, the electrically controlled, or magnetic, valve mechanism, as D, the storage tank or reservoir, as E, and the spool or reel mechanism for the circuit wires, as F. These elements have a connected and interdependent relationship in order to accomplish the result sought, namely, the provision of individual or unit air brake apparatus controllable individually, or in series, from a distant point by the use of a push button or switch in an electric circuit.

The truck or car here shown for illustrative purposes is of the usual form and comprises a rectangular frame of heavy beams $A^1$—$A^1$, with cross pieces $A^2$—$A^2$, and the wheels $A^3$—$A^3$, upon which said truck frame is mounted in the usual manner.

The air brake mechanism may be of the usual and well known construction and comprises an air cylinder $B^1$, with piston working therein as usual, with piston rod $B^2$ connected to a series of operating levers, as $B^3$, for operating the brake shoes $B^4$, in a well known manner and which need not be here described in detail.

The compressor may be mounted upon the under side of one of the cross beams $A^2$, as illustrated, and comprises a cylinder $C^1$, with piston $C^2$ working therein, and connected by means of an arm $C^3$ with an operating eccentric $C^4$, mounted upon one of the axles of the truck or car, as shown. The compressor is shown more in detail in the sectional view, Fig. 3. The cylinder $C^1$ is provided with an inlet, with check valve, as $C^5$, through which air rushes into the cylinder as the piston $C^2$ is moved downwardly. From the opposite side of said cylinder leads a pipe $C^6$, to a storage tank or reservoir, E, with a check valve interposed therein, as indicated, to prevent back flow. Mounted upon the side of said compressor cylinder $C^1$ and having a valve controlled communication therewith, is a governor mechanism for opening an outlet from the compressor when a certain predetermined pressure within the storage tank or reservoir has been reached. This governing mechanism comprises a cylindrical casing, as $C^7$, mounted upon the side of the compressor cylinder $C^1$ and adapted to have communication therewith through a passageway, as $C^8$, formed in the wall of said compressor cylinder $C^1$. Said governor cylinder $C^7$ is connected, as at $C^9$, with the pipe $C^6$ to the reservoir E, and is provided with a partition member, as $C^{10}$, dividing it into two chambers, within which are mounted two pistons, as $C^{11}$ and $C^{12}$. The piston $C^{11}$ controls a by-pass, $C^{13}$, between said chambers, and is held in its normal position, as shown in Fig. 3, by means of a coiled spring $C^{14}$. When a predetermined pressure within the storage tank or reservoir E is reached, this pressure operates through the pipe connection $C^9$ to move the piston $C^{11}$ outwardly so as to open the by-pass $C^{13}$ and permit air under pressure to pass to the opposite side of the partition $C^{10}$, where it operates to move the piston $C^{12}$. This piston $C^{12}$ is connected to a valve member, as $C^{15}$, which controls an outlet from the compressor cylinder $C^1$, through the passageway $C^8$, and opens it, whereby the air from said compressor cylinder passes out through said passageway $C^8$ and to the atmosphere through a passageway $C^{16}$, formed in a plug-like member $C^{17}$, screwed into the connected end of said governor $C^7$, as clearly illustrated. The piston $C^{12}$ is also held in position to normally close the valve member $C^{15}$ by means of a coiled spring $C^{18}$, seated in the end of the plug like member $C^{17}$ and bearing against the piston $C^{12}$.

So long as the pressure within the storage tank or reservoir E and in the pipe $C^6$, leading thereto, is sufficient to overcome the tension of the spring $C^{14}$, which tension can be regulated by means of a nut, as $C^{19}$, the piston $C^{11}$ will be held back and the passageway $C^{13}$ kept open so that air under pressure will move the piston $C^{12}$ and the valve member $C^{15}$ and thereby open an outlet from the compressor through passageway $C^{16}$. The reservoir E is connected by means of pipes $E^1$ and $E^2$, through the magnetic valve mechanism D, to an air brake cylinder B.

In Fig. 4 is shown a sectional view, taken on an irregular line 4—4 of Fig. 1, through an electrically controlled valve mechanism, for controlling the communication between the reservoir E, and the air brake cylinder B, and also the exhaust from said air brake cylinder B. This mechanism, as here illustrated, comprises a triangular shaped casing, secured to one of the cross beams $A^2$ of the truck, as clearly indicated in Fig. 1. At its three corners, said casing is provided with three cylindrical casings, as $D^1$, $D^2$ and $D^3$. with communicating passageways therebetween. as indicated in dotted lines, Fig. 1, and in the larger sectional drawing in Fig. 4. The passageway between chambers in $D^1$ and $D^2$ is designated as $D^4$ and is connected with the pipe $E^2$ leading to the air cylinder B. The passage-way between the chambers in $D^2$ and $D^3$ is designated $D^5$, and is connected with pipe $E^1$ leading from the tank or reservoir E. An exhaust, as $D^6$, opens from the passageway between $D^1$ and $D^3$, as shown, although in Fig. 4 the exhaust is illustrated by two projecting pipe ends for clearness only. Two electro-magnets $D^7$ and $D^8$ are mounted, respectively, upon the parts $D^1$ and $D^3$, which said magnets, by means of their cores, operate valve members, designated, respectively, as $D^9$ and $D^{10}$, for controlling passageways through said body or casing D The magnet $D^8$ is normally energized and the valve member $D^{10}$ is held in the up-position, as shown in Fig. 4. Thus air from the reservoir E, passes through the pipe $E^1$ into the governor casing D, and into the passageway $D^5$ therein. between chambers in $D^2$ and $D^3$, from which it passes through passageway $D^{11}$ into the lower part of the cylindrical casing $D^3$, of the governor body, and also into the passageway $D^{12}$, leading into the middle chamber, in $D^2$, of the governor casing. The air which passes through passageway $D^{11}$ into $D^3$, finds its way upwardly through a groove or by-pass $D^{13}$ in the valve member $D^{10}$, and thence through $D^{14}$, to the upper portion of chamber in $D^2$, above a valve member mounted therein and designated $D^{15}$ normally held down by means of the coiled spring $D^{16}$, acting against the under side of a plug $D^{17}$, screwed into the upper end of casing $D^2$. So long as the solenoid $D^8$ is energized and the valve member $D^{10}$ is in its raised position, as shown, the air can go no farther, and the valve member $D^{15}$ in the middle casing $D^2$, is not moved, for the air pressure is the same above and below it, and the spring holds it down. If the circuit to solenoid $D^8$ is broken, purposely, or accidentally, as in case of breaking the circuit wires, said solenoid $D^8$ is demagnetized, the valve member $D^{10}$ drops down and the groove $D^{13}$, forming the by-pass, is closed at its upper end, and at the same time a grooved by-pass $D^{18}$, in the upper end of said valve member $D^{10}$, is brought into communication, at its lower end, with the interior of the casing $D^3$, and it also retains communication therewith at its upper end, thereby opening an exhaust passageway from the chamber above the valve member $D^{15}$, through $D^{14}$, upwardly through groove $D^{18}$ and thence out through the exhaust $D^6$. The air from the passageway $D^5$ then must pass into the lower chamber of $D^2$ below the valve member $D^{15}$, and under the pressure said valve member $D^{15}$ is raised sufficiently to open an outlet at $D^{19}$, $D^{20}$ and $D^{21}$ to the passageway $D^4$ leading to the brake cylinder B, whereupon the brakes are set and remain so until the brake cylinder B is opened to an exhaust. This is accomplished by energizing solenoid $D^7$, which operates to raise the valve member $D^9$ and thereby open an outlet or exhaust from said brake cylinder B through passageways $D^4$, $D^{22}$, $D^{23}$ and $D^{24}$, to the exhaust $D^6$. The exhaust pipes $D^6$—$D^6$ are here shown (Fig. 4) as separate pipes, but in actual construction would preferably terminate in a single pipe, as at $D^6$, in Fig. 1.

I will next describe the circuit wires for controlling the magnet valves $D^7$ and $D^8$, and the reel upon which said circuit wires are wound, designated as a whole by F.

This comprises a double reel $F^1$, mounted in the frame $F^2$, upon a pin, as $F^3$, and has as a part thereof a pinion $F^4$, adapted to be driven from a spring controlled gear $F^5$, Fig. 1, whereby as the reel turns in one direction, said spring is tightened and tends to turn the reel in the opposite direction, as in a curtain roller, to wind up the wire thereupon. From the solenoid $D^8$ run two circuit wires 1 and 2, the wire 2 running to the truck wheel $A^3$, and to the ground through the rail, and the wire 1, running to and connecting with a terminal, as $F^6$, projecting from a wiper ring $F^7$, mounted in the frame $F^2$ and insulated therefrom, as shown. From the solenoid $D^7$ there also runs two circuit wires 3 and 4, the wire 4 running to the truck wheel $A^3$ and thence to the ground through the rail, and the wire 3 running to and connecting with a terminal, as $F^8$, projecting from a lower wiper or contact ring $F^9$, mounted in the lower part of the frame $F^2$, and insulated therefrom, as shown at $F^{10}$. Mounted upon the double reel, and separated from each other by an annular flange $F^{11}$, are two circuit wires 5 and 6, adapted to be unwound and extended to another truck, or to any desired point for switch control. The innermost ends of the wires 5 and 6 wound upon the reel $F^1$, are extended through the outer flanges of said reel, as at $5^a$ and $6^a$ and are connected, respectively to wiper members $F^{12}$ and $F^{13}$ mounted upon the opposite sides of said reel and adapted to engage, respectively, with the contact rings $F^7$ and $F^9$, whereby as the reel is turned to wind or unwind the wires 5 and 6, the wipers $F^{12}$ and $F^{13}$ move in contact with the contact rings $F^7$ and $F^9$, and thus maintain circuit connections between the wires 5 and 6, and the wires 1 and 3 from the solenoids $D^7$ and $D^8$, and make it possible to unwind the wires 5 and 6 to any desired length for connection to a truck at some distance therefrom, or to a switch at some desired point of control, without interfering with the circuit to said solenoids.

It will be understood, therefore, from the foregoing description that each car or truck is provided with a complete air brake mechanism comprising a compressor, which is operated by the movement of the car, a reservoir into which the air is stored, an air brake cylinder with connections to the brake shoes, as usual, and an electrically controlled valve mechanism for opening and closing communication between the reservoir and the air brake cylinder, and for opening and closing an exhaust from said air brake cylinder, thus making it necessary in connecting up a series of trucks or cars at various distances apart to provide only circuit wire connections between said trucks, instead of providing pipe or hose connections from one truck to another, as in the usual air brake system. Under the present form of the invention the magnet controlling the communicating passageway from the reservoir to the air brake cylinder is normally energized and closes said passageway. Therefore in case of accident which breaks the circuit wires, said magnet is deënergized and the passageway to said air brake cylinder is automatically opened and the brakes are set. If it is desired to set the brakes at will at any time, it is only necessary for the engineer to open a switch of any kind to open the circuit, and the same result is effected. The magnet which controls the exhaust passageway from the air brake cylinder is normally deënergized and in order to release the air and thereby release the brakes, it is necessary for the engineer or operator to close the circuit of the magnet, thereby moving the valve member $D^9$ which opens the exhaust and releases the brakes. Provision is also made for the exhaust from the compressor after a certain pressure is reached in the reservoir, as hereinbefore described. This is made necessary for the reason that the compressor is operated whenever the car is running, being driven from the axle, as before described.

I am aware that many changes can be made from the embodiment of the invention here shown for purposes of illustration without departing from the spirit thereof, and I do not, therefore, limit the invention to the particular form here shown, except as I may be limited by the hereto appended claims.

I claim:

1. In combination with a disconnected car, or truck, an individual and independent air brake mechanism operated by said car and adapted to be electrically controlled, circuit wires to said air brake mechanism, said circuit wires being adapted to be extended to other similar trucks at a distance therefrom, whereby said air brake mechanisms may be operated together, and means on said car for winding up and letting out said circuit wires to various distances.

2. In combination with a disconnected car, or truck, an individual or unit air brake apparatus therefor, adapted to be electrically controlled, the same comprising an air compressor operated by said truck, a reservoir connected thereto, an air cylinder with brake mechanism operable thereby, electrically controlled valve mechanism for opening and closing a communicating passageway from said reservoir to said air brake cylinders, circuit wires controlling said air brake mechanism, and means on said car for winding up and letting out said circuit wires to various distances.

3. In combination, a car provided with an individual air brake apparatus adapted to be electrically controlled, circuit connections therefor, adapted to be extended from one car to another, and means for winding up said circuit connections and letting them out at will, to permit said cars to be coupled at long distances apart, substantially as described.

4. A truck, or car, provided with an individual, or unit, air brake apparatus, comprising in combination, a source of air under pressure, an air brake cylinder with brake apparatus operable therefrom, magnet valves for controlling communication between said source of air and said air brake cylinder and the exhaust from said cylinder, circuit connections to said magnet valves, and means whereby said circuit connections can be unwound and extended to and connected with similar mechanisms of other cars, or trucks, whereby plural individual air brake apparatus can be electrically controlled in series, substantially as described.

Signed at Portland, Multnomah county, Oregon, this 17th day of October, 1913.

ELBERT G. CHANDLER.

In presence of
R. B. French,
J. C. Streng.

Copies of this patent may be obtained for five cents each, by addressing the "Commissioner of Patents, Washington, D. C."